US006893580B2

(12) United States Patent
Kawano et al.

(10) Patent No.: US 6,893,580 B2
(45) Date of Patent: May 17, 2005

(54) COMPOSITION FOR SYNTHETIC RESIN MAGNET AND FORMED RESIN MAGNET

(75) Inventors: Kota Kawano, Yokohama (JP); Hideharu Daifuku, Fujisawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/398,754

(22) PCT Filed: Jul. 30, 2001

(86) PCT No.: PCT/JP01/06545

§ 371 (c)(1), (2), (4) Date: Apr. 10, 2003

(87) PCT Pub. No.: WO02/33002

PCT Pub. Date: Apr. 25, 2002

(65) Prior Publication Data

US 2004/0094742 A1 May 20, 2004

(30) Foreign Application Priority Data

Oct. 13, 2000 (JP) ....................................... 2000-313954

(51) Int. Cl.[7] ................................................ C08L 77/08
(52) U.S. Cl. ..................................... 252/62.54; 399/277
(58) Field of Search ....................... 399/277; 252/62.54, 252/62.55

(56) References Cited

U.S. PATENT DOCUMENTS 5,376,291 A * 12/1994 Watanabe ................ 252/62.54
5,409,624 A * 4/1995 Watanabe ................ 252/62.54
5,958,283 A * 9/1999 Schmid et al. ........... 252/62.54

FOREIGN PATENT DOCUMENTS

| | | |
|---|---|---|
| JP | 5-304013 A | 11/1993 |
| JP | 5-315115 A | 11/1993 |
| JP | 8-167512 A | 6/1996 |
| JP | 9-80914 A | 3/1997 |
| JP | 2000-12319 A | 1/2000 |
| JP | 2001-240740 A | 9/2001 |

OTHER PUBLICATIONS

Translation of JP 2001–240740.*

* cited by examiner

*Primary Examiner*—C. Melissa Koslow
(74) *Attorney, Agent, or Firm*—Sughrue Mion, PLLC

(57) ABSTRACT

A composition for synthetic resin magnets (such as magnet rollers for electrophotography process) which is composed of a resin binder and a magnetic powder mixed and dispersed therein. The resin compound has improved melt flow rate because the binder contains a thermoplastic and an aliphatic polyamide. Owing to its improved melt flow rate, the resin compound can be incorporated with a large amount of magnetic powder without deterioration in moldability. Thus the resulting plastic magnet has a strong magnetic force. In addition, the composition for synthetic resin magnets may be incorporated with a hindered phenol antioxidant, so that it is molded at a higher temperature (120–180° C.) than usual to achieve the same object as mentioned above.

5 Claims, 1 Drawing Sheet

COMPOSITION FOR SYNTHETIC RESIN MAGNET AND FORMED RESIN MAGNET

TECHNICAL FIELD

The present invention relates to a composition for synthetic resin magnets and a molded formed resin magnet. The resin compound is composed of a resin binder and a magnetic powder mixed and dispersed therein. The resin compound is suitable as a raw material to be molded into plastic magnets, such as magnet rollers, which are incorporated into electrophotographic machines and electrostatic recording machines.

BACKGROUND ART

It has been known that those copying machines and printers which are based on the principle of electrophotography or electrostatic recording employ a developing roller to visualize an electrostatic latent image formed on a latent image supporter, such as sensitive drum. The developing roller consists of a rotating sleeve and a magnet roller placed therein. The magnetic roller is a molded plastic magnet and has a prescribed magnetized pattern. The developing roller attracts a magnetic developer (or toner) according to the magnetized pattern and transfers it to the latent image supporter by so-called jumping.

The above-mentioned magnetic roller is formed from a resin compound composed of a thermoplastic binder and a magnetic powder mixed therewith. Forming is accomplished by injection molding or extrusion molding in a magnetic field such that a desired magnetic pattern is made on the roller surface.

The recent advance in electrophotographic technology requires a more complex magnetic pattern on the magnet roller than before. One way to meet this requirement is to form a plurality of magnet pieces from the above-mentioned resin compound, which are magnetized according to the desired magnetic pattern, and arrange them on the surface of the shaft.

Such a magnet roller is conventionally prepared from a resin compound composed of a resin binder and a magnetic powder of ferrite or rare earth alloy dispersed therein. The resin binder is usually polyamide resin, such as polyamide-6 and polyamide-12, or polypropylene.

Nowadays, the magnet roller is required to have a stronger magnetic force as OA machines become higher precision, more sophisticated and need speedier operation. In other fields, too, there is an increasing demand for plastic magnets having a stronger magnetic force than before.

A conceivable way to meet this requirement is to increase the mount of ferrite magnetic powder to be incorporated into the resin compound from which magnet rollers are molded. The disadvantage of increasing the amount of ferrite magnetic powder is that the resulting resin compound is extremely poor in melt flow properties and moldability. Formed parts obtained from such a resin compound are uneven in magnetic force and poor in dimensional accuracy. Therefore, the amount of magnetic powder is limited as a matter of course, and this prevents incorporation with as much magnetic powder as necessary to meet the requirement for strong magnetic force.

The object of increasing magnetic force is achieved by replacing the ferrite magnetic powder with rare earth magnetic powder. However, the latter still poses a problem with poor melt flow properties if it is used in an amount enough for the desired magnetic force. A highly filled resin compound easily suffers short shot when molded into small magnet rollers.

DISCLOSURE OF THE INVENTION

The present invention was completed in view of the foregoing. It is an object of the present invention to provide a composition for synthetic resin magnets and a formed resin magnet, said resin compound having good melt flow properties and moldability despite its high content of magnetic powder filled therein and being capable of molding into a plastic magnet having a strong magnetic force.

In order to achieve the above-mentioned object, the present inventors carried out a series of researches which led to the finding that it is possible to effectively improve the melt flow rate of the composition for synthetic resin magnets if, when the resin compound is prepared from a thermoplastic resin binder and a magnetic powder, the resin binder is incorporated with an aliphatic polyamide represented by the formula (1) below. The resin compound obtained in this manner keeps good melt flow properties even though it is incorporated with a large amount of magnetic powder so that the formed part has a strong magnetic force. In this way it is possible to produce desired plastic magnets without problems with poor melt flow properties and poor moldability.

(1)

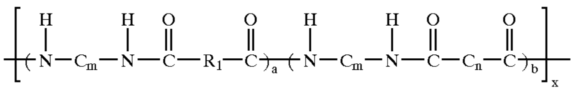

(where $R_1$ denotes $HOOC(CH_2)_nCOOH$ (n=7 or 8), $C_m$ denotes a diamine residue chain (m=2–20), $C_n$ denotes a dimer acid residue chain (n=20–48), a is an integer of 1–50, b is an integer of 1–50, and x is an integer of 1 to 50.)

The first aspect of the present invention resides in a composition for synthetic resin magnets which is composed of a resin binder and a magnetic powder mixed and dispersed therein, wherein said resin binder comprising a thermoplastic resin as a major constituent and an aliphatic polyamide, more specifically, the one which is represented by the formula (1) above. It also covers a formed resin magnet which is obtained from said resin compound.

Moreover, in order to achieve the above-mentioned object, the present inventors carried out a series of researches, with emphasis placed on the additive and molding conditions, which led to the finding that a composition for synthetic resin magnets which is composed of a resin binder and a magnetic powder mixed and dispersed therein has improved melt flow properties and gives a formed resin magnet with a high dimensional accuracy and good magnetizing performance with reduced variation in surface magnetic force, if it is incorporated with a prescribed amount of hindered phenol antioxidant and the resulting resin compound is molded at 120–180° C.

Thus, the second aspect of the present invention resides in a formed resin magnet which is molded in a desired shape at 120–180° C. from a composition for synthetic resin magnets which is composed of a resin binder, a magnetic powder, and a hindered phenol antioxidant.

BEST MODE FOR CARRYING OUT THE INVENTION

Figure 1:
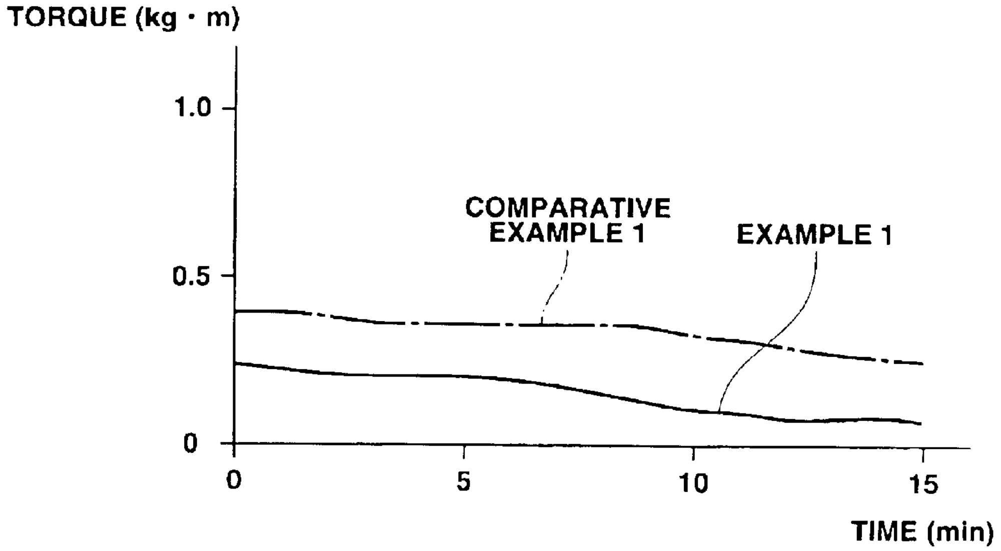
FIG. 1 is a graph showing the change in torque with time that takes place when the composition for synthetic resin magnets is prepared in Example 1 and Comparative Example 1.

A detailed description is given below of the first and second aspects of the present invention.

[The First Aspect of the Invention]

The first aspect of the present invention is concerned with a composition for synthetic resin magnets which is composed of a resin binder and a magnetic powder mixed and dispersed therein, said resin binder being composed of a major constituent of thermoplastic resin and an aliphatic polyamide.

The resin binder contains as a major constituent a thermoplastic resin which is one or more members selected from polyamide resin (polyamide-6, polyamide-12, etc.), polystyrene resin, polyethylene terephthalate resin (PET), polybutylene terephthalate resin (PBT), polyphenylene sulfide resin (PPS), ethylene-vinyl acetate copolymer resin (EVA), ethylene-ethyl acrylate resin (EEA), epoxy resin, ethylene-vinyl alcohol copolymer resin (EVOH), polypropylene resin (PP), polyolefins (such as polyethylene and polyethylene copolymer), and modified polyolefins (formed from polyolefins by introduction of reactive functional groups such as maleic anhydride group, carboxyl group, hydroxyl group, and glycidyl groups).

The thermoplastic resin as a major constituent is not specifically restricted in loadings. An adequate amount is 1–20 wt %, preferably 4–16 wt %, of the total amount of the composition for synthetic resin magnets. With an amount less than 1 wt %, the thermoplastic resin does not effectively contribute to improvement in melt flow properties even though an aliphatic polyamide (mentioned later) is added. Moreover, the resulting plastic magnet will be very brittle. On the other hand, with an amount more than 20 wt %, the thermoplastic resin accounts for a larger portion than the magnetic powder, and this makes it difficult to produce a plastic magnet having a strong magnetic force.

The major constituent of thermoplastic resin is incorporated with an aliphatic polyamide as mentioned above. This aliphatic polyamide is not specifically restricted so long as it achieves the object of the present invention. The one represented by the formula (1) below is preferable.

(1)

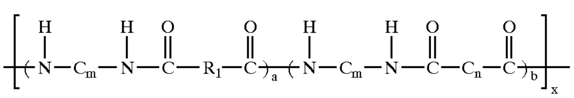

(where $R_1$ denotes $HOOC(CH_2)_nCOOH$ (n=7 or 8), $C_m$ denotes a diamine residue chain (m=2–20), $C_n$ denotes a dimer acid residue chain (n=20–48), a is an integer of 1–50, b is an integer of 1–50, and x is an integer of 1 to 50.)

An additional comment is made below on the symbols in the formula (1) above. $R_1$ denotes a dicarboxylic acid represented by $HOOC(CH_2)_nCOOH$, such as azelaic acid (n=7) and sebacic acid (n=8). The formula may have two kinds of blocks mixed together, each block containing azelaic acid (n=7) or sebacic acid (n=8). Cm denotes a diamine residue chain (m=2–20). It typically includes ethylenediamine, 1,4-diaminobutanehexamethylenediamine, nonamethylenediamine, undecamethylenediamine, dodecamethylenediamine, 2,2,4-trimethylhexamethylenediamine, bis-(4,4'-aminocyclohexyl)methane, and m-xylenediamine. $C_n$ denotes a dimer acid residue chain (n=20–48). It typically includes dimmers of oleic acid, linoleic acid, and erucic acid. In the formula, a is an integer of 1–50, b is an integer of 1–50, and x is an integer of 1 to 50. Incidentally, the aliphatic polyamide represented by the formula (1) should preferably (although not mandatory) have a number-average molecular weight of 1000–65000, more desirably 5000–25000.

The aliphatic polyamide represented by the formula (1) typically includes "PA-30L", "PA-30", "PA-40L", "PA-40", "PA-30R", "PA-30H", "PA-50R", "PA-50M", "PA-60", "PA-160", and "PA-260", which are available from Fuji Kasei Kogyo Co., Ltd. Those aliphatic polyamides which are not represented by the formula (1) above may also be used; however, those of elastomer type are excluded in the present invention.

The amount of the aliphatic polyamide varies without specific restrictions depending on the kind of the major constituent resin and the loadings of magnetic powder. It should preferably be 0.1–20 wt %, particularly 0.1–5 wt %, of the total amount of the composition for synthetic resin magnets. With an amount less than 0.1 wt %, the aliphatic polyamide does not fully produce the effect of improving the melt flow properties. With an amount more than 20 wt %, the aliphatic polyamide accounts for a large portion relative to magnetic powder, preventing the resulting plastic magnet from producing a sufficient magnetic force.

The binder resin composed of the major constituent resin and the aliphatic polyamide is incorporated with a magnetic powder as mentioned above. This magnetic powder may be any known one which has been used for conventional plastic magnets. It typically includes powder of ferrite such as Sr ferrite and Ba ferrite, and powder of rare earth alloy such as alnico alloy, Sm—Co alloy, Nd—Fe—B alloy, Sm—Fe—N alloy and Ce—Co alloy.

The magnetic powder used in the present invention is not specifically restricted in particle diameter. However, it should preferably be one which has an average particle diameter of 0.05–300 μm, particularly 0.1–100 μm, so that it has good orientation and loading properties and it has no adverse effect on the melt flow properties of the composition for synthetic resin magnets.

The magnetic powder may undergo any known surface treatment with a coupling agent, such as silane coupling agent or titanate coupling agent, before incorporation into the composition for synthetic resin magnets. The treated magnetic powder effectively contributes to the melt flow properties when it is incorporated in a large amount.

Preferred examples of silane coupling agent include γ-aminopropyltriethoxysilane, γ-aminopropyltrimethoxysilane, N-β-(aminoethyl)-γ-aminopropyltrimethoxysilane, ureidopropyltriethoxysilane, vinyltriethoxysilane, vinyltrimethoxysilane, vinyltris(β-methoxyethoxy)silane, γ-methacryloxy-propyltrimethoxysilane, γ-methacryloxypropyltriethoxysilane, β-(3,4-epoxycyclohexyl)ethyltrimethoxysilane, γ-glycidoxypropyltrimethoxysilane, γ-mercaptopropyltrimethoxysilane, γ-isocyanatepropyltriethoxysilane, methyltriethoxysilane, and methyltrimethoxysilane. Of these examples, γ-aminopropyltriethoxysilane, γ-aminopropyltrimethoxysilane, and N-β-(aminoethyl)-γ-aminopropyltrimethoxysilane are preferable.

Preferred examples of titanate coupling agent include isopropyl-bis(dioctylpyrophosphate) titanate, isopropyl-tri (N-aminoethyl-aminoethyl) titanate, isopropyl-triisostearoyl titanate, diisopropyl-bis(dioctylpryophosphate) titanate, etraisopropyl-bis(dioctylphosphite) titanate, tetraoctyl-bis (ditridecylphosphite) titanate, tetra(2,2-diallyloxymethyl-1-butyl)-bis-(ditridecyl)phosphite titante, bis (dioctylpyrophosphate)oxyacetate titanate, and bis (dioctylpyrophosphate)ethylene titanate. Of these example, isopropyl-bis(dioctylpyrophosphate) titanate is particularly desirable.

The amount of the magnetic powder may vary without specific restrictions depending on magnetic force required of the formed resin magnet. It is usually 80–99 wt % of the total amount of the composition for synthetic resin magnets. According to the present invention, the loadings of magnetic powder may exceed 90 wt % without adverse effect on the melt flow properties of the resin compound and the moldability of plastic magnets with a strong magnetic force. The present invention produces its remarkable effect in the case of high loadings with magnetic powder. However, the resin compound of the present invention permits uniform dispersion of magnetic powder even though the amount of loadings is rather small, say, about 80–90 wt %.

According to the present invention, the composition for synthetic resin magnets is composed of the major constituent resin, aliphatic polyamide, and magnetic powder as mentioned above. It should preferably (although not mandatory) be additionally incorporated with an adequate amount of antioxidant to protect the binder resin from deterioration due to oxidation. Any known antioxidant may be used without specific restrictions. Its typical examples include those derived from hindered phenol, hindered mine, and phosphorus.

The amount of antioxidant may vary without specific restrictions depending on the kind of antioxidant and binder resin. It should preferably be 0.1–20 wt %, particularly 0.1–3 wt %, of the total amount of the composition for synthetic resin magnets.

According to the present invention, the composition for synthetic resin magnets may optionally be incorporated with a dispersing agent, lubricant, and plasticizer in an adequate amount.

The dispersing agent includes phenol-based ones and amine-based ones. The lubricant includes waxes such as paraffin wax and microcrystalline, and fatty acids such as stearic acid and oleic acid, and metal salts thereof such as calcium stearate and zinc stearate. The plasticizer includes monoester and polyester plasticizers and epoxy plasticizers.

In addition, according to the present invention, the composition for synthetic resin magnets may optionally be incorporated with a reinforcing filler such as mica, whisker, talc, carbon fiber, and glass fiber, in an amount not harmful to the effect of the present invention. The formed resin magnet tends to be less rigid if it merely requires a comparatively weak magnetic force and hence the amount of magnetic powder therein is comparatively small. In this case it is desirable to add a reinforcing filler, such as mica and whisker, to increase rigidity. Reinforcing fillers suitable for the present invention are mica and whisker. Examples of the whisker include non-oxide whiskers formed from silicon carbide or silicon nitride, metal oxide whiskers formed from any of ZnO, MgO, $TiO_2$, $SnO_2$, and $Al_2O_3$, and compound oxide whiskers formed from potassium titanate, aluminum borate, and basic magnesium sulfate. Of these examples, compound oxide whiskers are desirable because of their good miscibility with resin.

The amount of the reinforcing filler is not specifically restricted; however, it is usually 1–50 wt %, preferably 5-20 wt %, of the total amount of the composition for synthetic resin magnets. Incidentally, the composition for synthetic resin magnets may be incorporated with any additives other than the above-mentioned dispersing agent, lubricant, plasticizer, and filler, within the scope of the present invention. Examples of such additives include organotin stabilizers.

The following deals with the formed resin magnet pertaining to the first aspect of the present invention, which is obtained from the composition for synthetic resin magnets.

The formed resin magnet pertaining to the first aspect of the present invention is obtained by molding from the above-mentioned composition for synthetic resin magnets. It is characterized by high dimensional accuracy, uniform magnetic force, and strong magnetic force. The composition for synthetic resin magnets according to the present invention retains good melt flow properties even though it is incorporated with a large amount of magnetic powder. Therefore, it permits incorporation with a large amount of magnetic powder necessary for a strong magnetic force and yet it readily flows without short-shot in mold cavities at the time of molding, permitting uniform dispersion and orientation of magnetic powder. The formed resin magnet thus obtained is suitable for high-performance magnet rollers with a strong magnetic force.

The formed resin magnet can be readily obtained by molding the composition for synthetic resin magnets in molten state. Molding may be accomplished by any of injection molding, extrusion molding, compression molding, etc. which is suitable for the desired plastic magnet. Ordinary molding conditions may be employed according to the composition of the resin compound and the shape of the desired plastic magnet.

The first aspect of the present invention is characterized in that the composition for synthetic resin magnets is based on a binder resin incorporated with an aliphatic polyamide. Therefore, the resin compound has good melt flow properties and hence exhibits good moldability at the time of injection molding, extrusion molding, compression molding, etc. This makes it possible to produce a plastic magnet with high loadings of magnetic powder for a strong magnetic force without adverse effect on moldability.

[The Second Aspect of the Invention]

The second aspect of the present invention is concerned with a formed resin magnet which is obtained by molding into a desired shape at 120–180° C. from a composition for synthetic resin magnets which is composed of a resin binder, magnetic powder, and hindered phenol antioxidant.

The resin binder in the resin compound is not specifically restricted; it may be the same thermoplastic resin as exemplified as the major constituent resin in the resin compound pertaining to the first aspect of the present invention. More than one thermoplastic resin may be used alone or in combination. In the second aspect of the present invention, the thermoplastic resin may be any of polyamide-6, polyamide-12, polyamide-66, polyamide-11, and polyamide-46. Of these examples, polyamide-12 and polyamide-6 are particularly preferable.

The resin binder may be mixed with an aliphatic polyamide as in the first aspect of the present invention.

The resin binder may be incorporated with any magnetic powder which is not specifically restricted. Examples of the magnetic powder include ferrite powder, alnico alloy powder, and rare earth alloy powder, which were exemplified above in the first aspect of the present invention. In the second aspect of the present invention, rare earth alloy powder is preferable because of its strong magnetic force. Preferred examples of the rare earth alloy powder include Nd-based magnetic powder such as $Nd_2Fe_{14}B$ and $Nd_{12}Fe_{78}Co_4B_6$, and Sm-based magnetic powder such as $Sm_2Fe_{17}N_3$. These magnetic powders may be used alone or in combination with one another. The magnetic powder is not specifically restricted in particle diameter. However, it should preferably have an average particle diameter of 1–250 μm, particularly 20–50 μm, so that it has good orientation and loading properties and it has no adverse effect on the melt flow properties of the composition for synthetic resin magnets. Also, the magnetic powder may be previously surface-treated with a silane coupling agent or the like in the same way as in the first aspect of the present invention.

In the composition for synthetic resin magnets from which the formed resin magnets is obtained according to the second aspect of the present invention, the mixing ratio of the resin binder and the magnetic powder varies without specific restrictions depending on the strength of magnetic force required of the resulting formed resin magnet. Usually, the amount of magnetic powder is 70–95 wt % of the total amount of the composition for synthetic resin magnets (having a density of 2.5–6.0 g/$cm^3$). According to the present invention, the resin compound may be incorporated with more than 80 wt %, particularly 80–95 wt %, of magnetic powder (for the resin compound to have a density of 3.2–6.0 g/$cm^3$), without adverse effect on the melt flow properties, owing to the incorporation with a hindered phenol antioxidant (mentioned later) which improves the melt flow properties.

According to the present invention, the composition for synthetic resin magnets is incorporated with a hindered phenol antioxidant. The hindered phenol antioxidant is not specifically restricted; any commercial ones can be used. Typical examples are listed next. N,N'-bis[3-(3,5-di-t-butyl-4-hydroxyphenyl)propionyl]hydrazine, "IRGANOX MD 1024", from Ciba Specialty Chemicals K.K. Triethyleneglycol bis[3-(3-t-butyl-5-methyl-4-hydroxyphenyl) propionate], "IRGANOX 245, 245FF, 245DWJ", from Ciba Specialty Chemicals K.K. Pentaerythritol tetrakis[3-(3,5-di-t-butyl-4-hydroxyphenyl)propionate], "IRGANOX 1010, 101OFP, 1010FF", from Ciba Specialty Chemicals K.K. Thiodiene bis[3-(3,5-t-butyl4-hydroxyphenyl)propionate], "IRGANOX 1035, 1035FF", from Ciba Specialty Chemicals K.K. Octadecyl-3-(3,5-di-t-butyl-4hydroxyphenyl) propionate, "IRGANOX 1076, 1076FF, 1076FD, 1076DWJ", from Ciba Specialty Chemicals K.K. N,N'-hexane-1,6-diylbis[3,5-di-t-butyl-4-hydroxyphenylpropionamide], "IRGANOX 1098", from Ciba Specialty Chemicals K.K. Ester of benzenepropanoic acid with 3,5-bis(1,1'-dimethylethyl)-4-hydroxyalkyl ($C_7$, $C_9$ side chains), "IRGANOX 1135", from Ciba Specialty Chemicals K.K. 2,4-dimethyl-6-(1-methylpentadienyl) phenol+IRGANOX 1076, "IRGANOX 1141", from Ciba Specialty Chemicals K.K. Diethyl{[3,5-bis(1,1-dimethylethyl)-4-hydroxyphenyl]methyl} phosphate, "IRGANOX 1222", from Ciba Specialty Chemicals K.K. 3,3',3",5, 5',5"-hexa-t-butyl-a,a',a"-(mesitylene-2,4,6-toluyl) tri-p-cresol, "IRGANOX 1330", from Ciba Specialty Chemicals K.K. Calcium diethyl bis{[[3,5-bis(1,1-dimethylethyl)-4-hydroxyphenyl]-methyl]phosphate}+polyethylene wax, "IRGANOX 1425WL", from Ciba Specialty Chemicals K.K. 4,6-bis(octylthiomethyl)-o-cresol, "IRGANOX 1520L", from Ciba Specialty Chemicals K.K. Hexamethylene bis[3-(3,5-di-t-butyl-4-hydroxyphenyl) propionate], "IRGANOX 259", from Ciba-Specialty Chemicals K.K. 1,3,5-tris(3,5-di-t-butyl-4-hydroxybenzyl)-1,3,5-triazine-2,4,6-(1H, 3H, 5H)-trione, "IRGANOX 3114", from Ciba Specialty Chemicals K.K. 1,3,5-tris[(4-t-butyl-3-hydroxy-2,6-xylyl)methyl-1,3,5-triazine-2,4,6-(1H, 3H, 5H)-trione], "IRGANOX 3790", from Ciba Specialty Chemicals K.K. Reaction product of N-phenylbenzeneamine and 2,4,4-trimethylpentene, "IRGANOX 5057", from Ciba Specialty Chemicals K.K. 2,6-di-t-butyl-4-(4,6-bis(octylthio)-1,3,5-triazin-2-ylamino) phenol, "IRGANOX 565, 565DD", from Ciba Specialty Chemicals K.K. Tris(2,4-di-t-butylphenyl)phosphite, "IRGANOX 168, 168FF", from Ciba Specialty Chemicals K.K.

The amount of the hindered phenol antioxidant to be added is adequately determined according to the kind of the magnetic powder and binder resin. It is usually 0.1–20 wt %, preferably 0.1–5 wt %.

As in the first aspect of the present invention, the composition for synthetic resin magnets may optionally be incorporated with the above-mentioned dispersing agent, lubricant, plasticizer, and a reinforcing filler such as mica, whisker, talc, carbon fiber, and glass fiber, in an amount sufficient to disperse the magnetic powder.

The composition for synthetic resin magnets may be prepared in any manner without specific restrictions. For example, one method for preparation consists of mixing together the resin binder and magnetic powder and optional dispersing agent and filler in the usual way. The resulting mixture is formed into pellets by melt-mixing. Thus there is obtained the desired resin compound in pellet form. Melt-mixing may be accomplished in the usual way under ordinary conditions by using a single-screw or twin-screw extruder or KCK extruder.

The formed resin magnet according to the present invention is obtained by molding in a desired shape at 120–180° C. from the composition for synthetic resin magnets which contains a hindered phenol antioxidant as mentioned above. Molding may be accomplished by injection molding, extrusion molding, compression molding, etc., with the mold temperature kept at 120–180° C. Injection molding is preferable.

According to the second aspect of the invention, by synergistic effect of setting the molding temperature higher than 85–100° C. as usual and improving the flow property of the hindered phenol antioxidant, the formed resin magnet is obtained in the condition that the melt flow rate (MFR) of the composition for synthetic resin magnets injected in the mold cavity is accomplished to be high. Thus, the formed resin magnet, which has a high dimensional accuracy and a strong surface magnetic force with uniform distribution, can be obtained.

As mentioned above, the second aspect of the present invention offers the advantage that the composition for synthetic resin magnets is superior in melt flow properties because it contains, in addition to the resin binder and magnetic powder, a hindered phenol antioxidant which improves melt flow properties and it is molded at 120–180° C. Therefore, according to the second aspect of the present invention, it is possible to provide a formed resin magnet which has a high dimensional accuracy and a uniform strong magnetic force.

The composition for synthetic resin magnets pertaining to the first and second aspects of the present invention will find various applications without specific restrictions. Particularly preferred examples include magnet rollers (and parts thereof) used in electrophotographic machines and electrostatic recording machines. Such rollers are required to have a strong magnetic force and advanced magnetic performance. Such a magnetic roller usually consists of a roller proper (of plastic magnet) and shafts projecting from both ends thereof. In this case, the desired magnet roller may be formed around a metal shaft which has previously been placed in the mold. Alternatively, the shafts may be molded integrally with the magnet roller proper.

In the case where sophisticated magnetic performance is required, the desired roller may be formed by attaching to a metal shaft rod-shaped plastic magnets which have previously been formed from the resin compound pertaining to the first or second aspect of the present invention. In this case it is not always necessary to form all the rod-shaped plastic magnets from the resin compound pertaining to the first or second aspect of the present invention. Instead, only those plastic magnets which need a particularly strong magnetic force may be formed from the resin compound pertaining to the first or second aspect of the present invention. Magnetization of the magnet roller may be accomplished simultaneously with molding in a magnetic field formed around the mold, or after molding by using any known magnetizing machine.

EXAMPLE

The invention will be described in more detail with reference to the following Examples and Comparative Examples, which are not intended to restrict the scope thereof.

Example 1

A magnetic powder having an average particle diameter of 100 μm was prepared by crushing an Nd-based rare earth alloy having a composition of $Nd_{12}Fe_{78}Co_4B_6$ (in atom wt %), "MQP-B" made by General Motors Inc. The magnetic powder was surface-treated with a silane coupling agent, "A1100" from Nippon Unicar Co., Ltd.

The following components were mixed at 250° C. for 15 minutes with a rotational speed of 50 rpm, by using "Labo Plastomill, Model 50C150" (60 $cm^3$ in capacity), made by Toyo Seiki Co., Ltd. Magnetic powder: 188 g (mentioned above), Nylon-12: 6.8 g, "P 3012 U" from Ube Industries. Ltd., Antioxidant: 3.5 g, "IRGANOX MD 1024" from Ciba Specialty Chemicals K.K., Aliphatic polyamide: 1.7 g, "PA-30L" from Fuji Kasei Co., Ltd. Thus, there was obtained the composition for synthetic resin magnets pertaining to the first aspect of the present invention. During melt mixing, the melt was examined for change in torque values. The results are shown in FIG. 1. The resin compound with high torque values has a high melt viscosity and hence is poor in melt flow properties. It is to be noted from FIG. 1 that the resin compound in Example 1 retains low torque values (and hence low melt viscosity) during mixing for 15 minutes.

The thus obtained composition for synthetic resin magnets was tested for melt flow rate (MFR) by using a melt indexer (made by Toyo Seiki Co., Ltd.). It was found to have an MFR of 72.7 g/10 min (at 250° C., 5 kgf). This value suggests good melt flow rate.

Further, the composition for synthetic resin magnets was injection-molded with magnetization, into a cylindrical test piece, 20 mm in diameter and 6 mm height. The test piece was examined for magnetic energy product ($BH_{max}$). The result was 54.91 $kJ/m^3$. This value suggests a strong magnetic force.

Comparative Example 1

The same procedure as in Example 1 was repeated to prepare the composition for synthetic resin magnets, except that the aliphatic polyamide was not used and the amount of the nylon-12 was increased to 8.5 g. The resulting resin compound was examined for change in torque value during melt-mixing in the same way as in Example 1. The results are shown in FIG. 1. The sample was also measured for MFR and $BH_{max}$ in the same way as in Example 1.

The sample in Comparative Example 1 did not increase in torque values during melt-mixing as shown in FIG. 1; however, it was poor in melt flow properties, with an MFR value being 9.48 g/10 min (at 250° C., 5 kgf). In addition, it was also inferior in $BH_{max}$ (51.73 $kJ/m^3$) to the sample in Example 1.

Example 2

A magnetic powder with surface treatment was prepared from the following components. Sr ferrite: 50.00 kg, "NF110" from Nippon Bengara Kogyo Co., Ltd. Ba ferrite: 20.55 kg, "DNP-S" from Nippon Bengara Kogyo Co., Ltd. Silane coupling agent: 0.71 kg, "A1100" from Nippon Unicar Co., Ltd.

The thus obtained magnetic powder was mixed with following components by using a twin-screw mixer. Nylon-6: 12.5 kg, "P 1010" from Ube Industries. Ltd., Antioxidant: 0.42 kg, "IRGANOX 245" from Ciba Specialty Chemicals K.K., Aliphatic polyamide: 0.42 kg, "PA-30L" from Fuji Kasei Co., Ltd. The resulting mixture was palletized to give the composition for synthetic resin magnets pertaining to the first aspect of the present invention.

The thus obtained composition for synthetic resin magnets was measured for flow rate (MFR) by using a melt indexer (made by Toyo Seiki Co., Ltd.). It was found to have an MFR of 156.84 g/10 min (at 270° C., 5 kgf). This value suggests good melt flow properties. Further, the composition for synthetic resin magnets was injection-molded in a magnetic field into a cylindrical plastic magnet, 9.6 mm in diameter. The plastic magnet was measured for surface magnetic force. A value of 80.5 mT was obtained.

Comparative Example 2

The same procedure as in Example 1 was repeated to prepare the resin compound (in pellet form) for plastic magnets, except that the aliphatic polyamide was not used and the amount of the nylon-6 was increased by 0.42 kg to 12.92 kg.

The resulting composition for synthetic resin magnets was measured for MFR in the same way as in Example 2. The measured MFR was 123.99 g/10 min (at 270° C., 5 kgf). This result suggests that the sample in Comparative Example 2 is inferior in melt flow properties to that in Example 2.

Further, the composition for synthetic resin magnets was made into a cylindrical plastic magnet in the same way as in Example 2. The plastic magnet was measured for surface magnetic force. A value of 789.9 mT was obtained. This value is lower than that in Example 2.

Example 3

A magnetic powder having an average particle diameter of 50 μm was prepared by crushing an Nd-based rare earth alloy having a composition of $Nd_{12}Fe_{78}Co_4B_6$ in atom wt % ("MQP-B" having an average particle diameter of 50 μm, made by General Motors Inc). The magnetic powder was surface-treated with a silane coupling agent, "A1100" from Nippon Unicar Co., Ltd. The following components were mixed by using a single-screw mixer. Magnetic powder: 1880 g (mentioned above), Nylon-12 as a resin binder: 120 g, "P 3012 U" from Ube Industries. Ltd., N,N'-bis[3-(3,5-di-t-butyl-4-hydroxyphenyl)propionyl]-hydrazine (as a hindered phenol antioxidant): 50 g, "IRGANOX MD 1024" from Ciba Specialty Chemicals K.K.

The resulting mixture was palletized to give the desired resin compound (in pellet form) for plastic magnets. This resin compound was found to have an MFR of 185 g/10 min (at 250° C., 5 kgf). The composition for synthetic resin magnets was injection-molded under the following conditions. Cylinder temperature: 270° C., Mold temperature: 150° C., Injection pressure: 100 kg/cm$^2$, Gate: at one end of the molded piece. Thus there was obtained a formed resin magnet (300 mm long with a cross section of 3x3 mm) pertaining to the second aspect of the present invention. The resulting sample was found to have a high dimensional accuracy and a uniform surface magnetic force.

Comparative Example 3

The same procedure as in Example 3 was repeated to prepare the composition for synthetic resin magnets, except that the amount of the nylon-12 was increased to 170 g and the hindered phenol antioxidant "IRGANOX MD 1024" was not added. The resulting resin compound was found to have an MFR of 97 g/10 min (at 250° C., 5 kgf). This value is considerably lower than that in Example 3. The resin compound was injection-molded into a plastic magnet under the same condition as in Example 3. No satisfactory plastic magnets were obtained due to poor moldability causing short shot.

Comparative Example 4

The same procedure as in Example 3 was repeated to produce a plastic magnet from the composition for synthetic resin magnets having the same composition as in Example 3, except that the mold temperature in injection molding was reduced to 100° C. No satisfactory plastic magnets were obtained due to poor moldability causing short shot.

Example 4

The same procedure as in Example 3 was repeated to give the composition for synthetic resin magnets, except that the N,N'-bis[3-(3,5-di-t-butyl-4-hydroxyphenyl)propionyl] hydrazine (as a hindered phenol antioxidant) was replaced by the same amount (50 g) of triethyleneglycol bis[3-(3-t-butyl-5-methyl-4-hydroxyphenyl)propionate, "IRGANOX 245" from Ciba Specialty Chemicals K.K. The resulting resin compound was found to have an MFR of 133 g/10 min (at 250° C., 5 kgf).

This resin compound was molded into plastic magnets pertaining to the second aspect of the present invention, under the same conditions as in Example 3. Satisfactory molded products were obtained.

Comparative Example 5

The same procedure as in Example 4 was repeated to produce a plastic magnet from the composition for synthetic resin magnets having the same composition as in Example 3, except that the mold temperature in injection molding was reduced to 100° C. No satisfactory plastic magnets were obtained due to poor moldability causing short shot.

What is claimed is:

1. A composition for synthetic resin magnets which is composed of a resin binder and a magnetic powder mixed and dispersed therein, wherein said resin binder comprises a thermoplastic resin as a major constituent and an aliphatic polyamide (excluding that of elastomer type), wherein the aliphatic polyamide is represented by the formula (1) below:

(1)

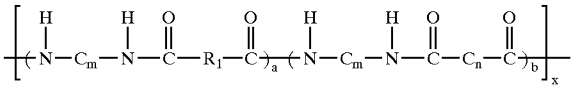

where $R_1$ denotes $HOOC(CH_2)_nCOOH$ (n=7 or 8), $C_m$ denotes a diamine residue chain (m=2–20), $C_n$ denotes a dimer acid residue chain (n=20–48), a is an integer of 1–50, b is an integer of 1–50, and x is an integer of 1 to 50.

2. The composition for synthetic resin magnets as defined in claim 1, which contains an antioxidant.

3. The composition for synthetic resin magnets as defined in claim 2, wherein the magnetic powder, major constituent resin, aliphatic polyamide, and antioxidant are mixed in the following ratio.

| | |
|---|---|
| magnetic powder: | 80–99 wt %; |
| major constituent resin: | 1–20 wt %; |
| aliphatic polyamide: | 0.1–20 wt %; and |
| antioxidant: | 0.1–20 wt %. |

4. A formed resin magnet which is formed in a desired shape from the composition for synthetic resin magnets as defined in claim 1.

5. The formed resin magnet as defined in claim 4, which is a magnet roller used for development in electrophotography process.

* * * * *